No. 766,025. PATENTED JULY 26, 1904.
G. S. DUNCAN.
SLIME FILTERING APPARATUS.
APPLICATION FILED FEB. 9, 1904.
NO MODEL. 3 SHEETS—SHEET 3.

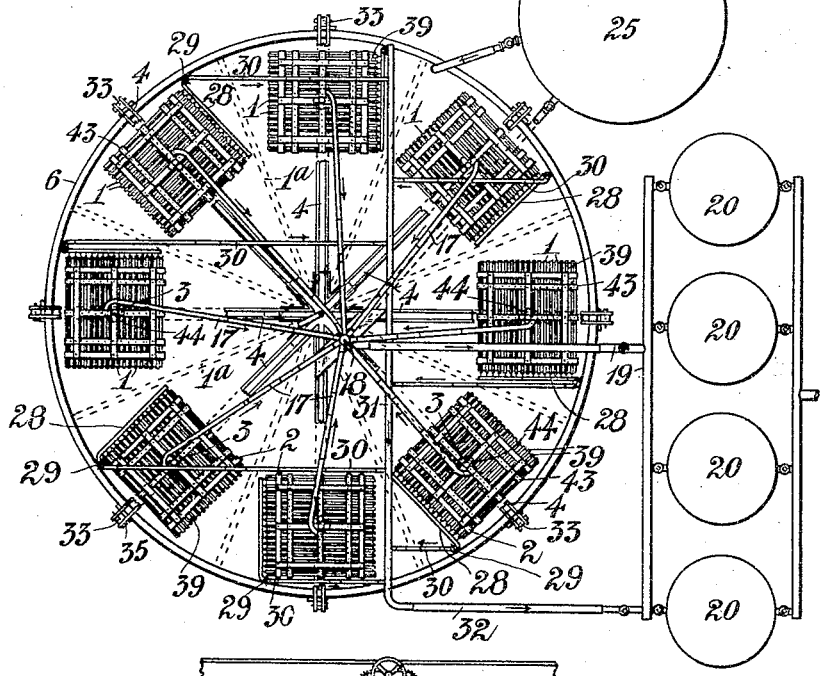

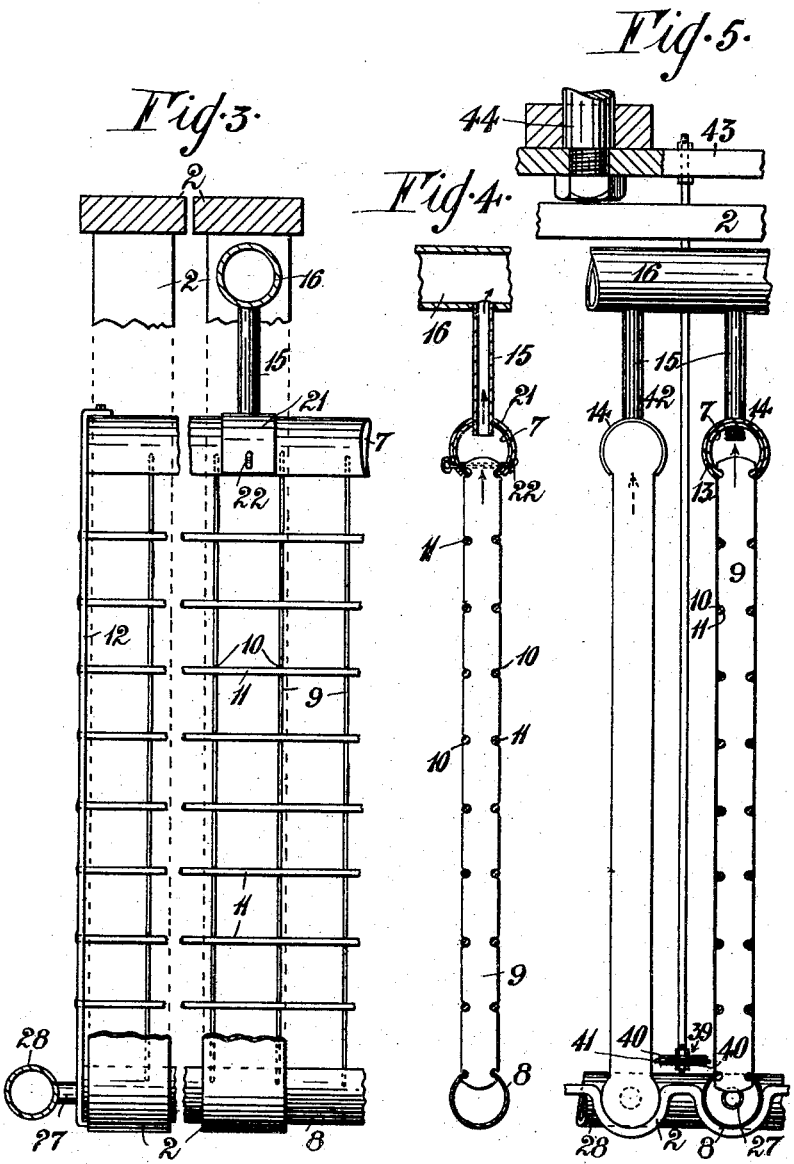

No. 766,025. Patented July 26, 1904.

UNITED STATES PATENT OFFICE.

GEORGE SMITH DUNCAN, OF MELBOURNE, VICTORIA, AUSTRALIA.

SLIME-FILTERING APPARATUS.

SPECIFICATION forming part of Letters Patent No. 766,025, dated July 26, 1904.

Application filed February 9, 1904. Serial No. 192,843. (No model.)

*To all whom it may concern:*

Be it known that I, GEORGE SMITH DUNCAN, civil engineer, a subject of the King of Great Britain, residing at No. 1 Temple Court, Chancery Lane, Melbourne, in the State of Victoria, Australia, have invented Improved Slime-Filtering Apparatus, of which the following is a specification.

This invention has been devised to provide a rapid, economic, and thorough separation of gold and silver bearing solutions from finely-divided residual ores or slimes.

The object is achieved by means of a large number of hollow flat vertical filters worked under vacuum, which are suspended within the vat containing the material to be treated, each of said filters consisting of a skeleton framing covered with filter-cloth and arranged comparatively close and parallel to each other with scrapers between.

The filters are connected on top to a pipe in communication with a vacuum-tank, which receives the solutions as they are filtered, and the scrapers are reciprocated between said filters at intervals to remove the muddy coating and carry it below the bottom of filters and to prevent clogging.

The accompanying drawings illustrate the construction of the apparatus, and it will be noticed that some of the parts thereof are omitted in the various figures to facilitate a clearer understanding.

Figure 6:
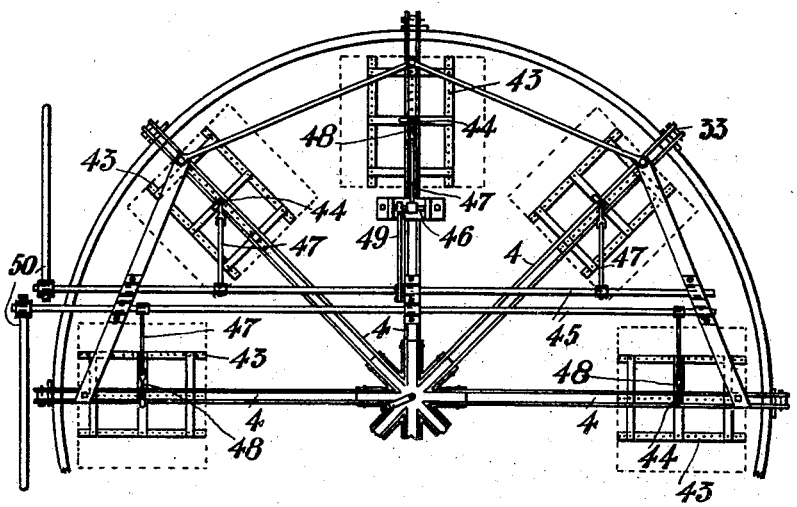
Figure 7:
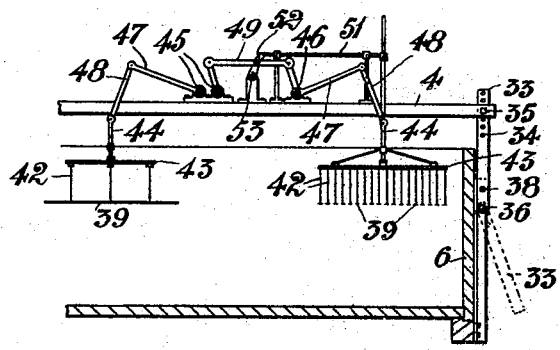

Figure 1 is a plan of most of the apparatus; Fig. 2, a transverse section through two of the groups or series of the filters in the vat. Fig. 3 is an enlarged side elevation of a portion of a filter-frame. Fig. 4 is an enlarged transverse section of said filter-frame. Fig. 5 is an enlarged view, partly in section, of two of the filter-frames and adjacent parts. Fig. 6 is a slightly-enlarged plan of portion of the vat, illustrating the means for reciprocating the scrapers. These parts are separated from Fig. 1 to avoid confusion of multiplex lines. Fig. 7 is a transverse section of the vat, showing the mechanism of Fig. 6 and also the means for imparting a lateral movement to the scrapers.

According to this invention the filters 1 are arranged in sectional groups or series, as shown in Fig. 1, and where stirrers $1^a$ are used each section may fit in between the arms of the stirrers. Each group of filters has independent connections with the vacuum-tank receivers, so that any number may be brought into operation or disconnected.

The filters are carried in open frames 2, constructed of bar-iron, which encircle the filters transversely in each section, the bottom bars being bent in between said filters to keep them apart and maintain them parallel, as shown in Fig. 5. Each frame is suspended by rods 3 from overhead arms 4, adapted to be lowered and raised by any suitable device—such, for instance, as a traveling crane 5, as shown in Fig. 2—so that the bottom of frames may be suspended at any desired distance above the bottom of vat 6 where filters are at work to enable the residual slimes to fall below the bottom of said filters.

Each of the filter skeleton frames shown in Figs. 3, 4, and 5 is made up of top and bottom longitudinal curved sheet-iron covers 7 and 8, which form the top and bottom channels of filters. Into these covers vertical strips of hoop-iron 9 are sprung and secured to the edges of the covers by holes punched in the edges of the vertical strips. The said vertical strips are spaced longitudinally at short distances apart and have holes 10 punched in their edges from top to bottom at short distances apart, into which horizontal wires 11 are passed, the outside of the wires being flush, or nearly so, with the edges of the vertical strips, the two end ones 12 projecting over the ends of the top and bottom covers and are bolted to them. The filter-cloth 13 is then wrapped round the skeleton framing and suitably secured on the top and ends—as, for instance, by spring-clips 14, extending the full length of the top cover. Other narrow clips may be sprung over said clips at intervals. The filter then is practically divided into a series of vertical passages communicating with horizontal top and bottom longitudinal channels.

Each filter has a draw-off pipe 15 at the top situate about the center, and the draw-off pipes of each series of filters are connected to a transverse pipe 16 and thence by means of pipes 17 to a common vertical delivery-pipe 18, connected, by means of other pipes 19, to a series of vacuum-tank receivers 20. The pipes 17 are provided with a cock 17ª, Fig. 2, by means of which any individual group of filters may be cut off and thrown out of action.

The draw-off pipes 15 pass through the top cover 7 and are screwed into a metal strap 21, adapted to be sprung over the cover and secured thereto by a pin 22, as shown in Figs. 3 and 4. The vertical delivery-pipe 18 is fitted with the necessary cocks 23 24 and connections to admit washing-water into filters from an overhead tank 25 and to shut off the vacuum and admit air through a cock 26 into the filters when required. The pipe connections between the rigid parts of the apparatus and the movable have flexible rubber suction-hosing interposed and also sight-glass tubes 17', as shown.

When the required quantity of clear liquid is separated from the slimes, the vacuum is cut off by cock 24, and the hollow filters remain full of the clear gold and silver bearing solutions, to empty which a run-off pipe 27 is provided at one end of the bottom channel-cover of each filter. (See Figs. 1, 3, and 5.) The said pipes are connected to a transverse pipe 28, which has a cock 29, Figs. 1 and 2, fixed near its end, and therefrom a vertical pipe 30 flexible at one end connects, through the medium of pipes 31 32, with the vacuum-tank receivers 20. Retention-valves may be fitted in each run-off pipe.

Before opening the cock 29 to empty the filters air is admitted by the cock 26 into the top draw-off pipes. The said cock 29 is always kept closed while the solution is being filtered from the slimes.

When the required quantity of first solution (or strongs) has been filtered off and the filters are emptied, the frames 2 carrying same are raised by the crane 5, washing-water is then introduced into the vat and mixed and agitated with the pulp, part of the washing-water is passed through the suspended filters through the medium of pipes 18 17 to clean the cloths, the filters are then emptied of any wash-water they may contain, and they are lowered again, when the operation of filtering is repeated. The filtered liquid from washings is drawn into a separate vacuum-tank receiver through the top draw-off pipe 17 of filters.

The overhead arms 4, from which the frames 2 depend, are adapted to engage vertical bars 33 on the side of the vat having a series of holes 34, through which a pin 35 may be inserted to adjust the height of said frame in the vat. The bars 33 are pivoted at the bottom end, as at 36, so that by removing the fixing-bolt 38 they may be swung down, as shown by dotted lines in Fig. 7, and so facilitate the removal of the filters from the vat.

The scrapers 39, which, as before stated, are reciprocated vertically at intervals between the filters, consist of two horizontal metallic strips 40 40, bolted together, preferably curved downward at their edges, and have a rubber 41 or like insertion or packing between, the edges of which project laterally, and the whole is suspended by rods 42, attached to frames 43. These scrapers are carried by vertical rods 44, which are suspended from the overhead arms 4, carrying the filters, and are operated mechanically or manually. A suitable mechanical device is shown in Figs. 6 and 7 and comprises rock-shafts 45 46, extending across the vat, with levers 47 thereon connected by links 48 to the vertical rod 44 of each scraper-frame. Motion is imparted to the intermediate shaft 46 by links 49, and the main shafts 45 are rocked by hand-levers 50 or other mechanical device. It should be noted that the width of said scrapers should be less than the space between the adjacent filter-surfaces, as shown in Fig. 5, so that first one and then the other may be scraped. The side movement of the scrapers necessary for this object in actual practice is only a fractional part of an inch and may be imparted by hand-levers extending from each scraper-frame or by the means illustrated in Fig. 7 for operating several at a time. In the latter case the vertical rods 44 of the scrapers are extended upwardly and pass through a hole in the end of horizontal connecting-rods 51, mounted in suitable bearings on the overhead arms 4. Said rods 51 are connected by links 52 and, if necessary, bell-crank levers to a common rock-shaft 53 operated at intervals manually or mechanically.

When the filters with their frames are lowered into the vat, they are full of air and tend to float on top of the pulp. They may be forced down and held at the required position in the vat by a mechanical device fitted to overhead framing, such as a lever or weight, until such time as the vacuum is turned on and the filters filled up with the solutions.

Having now particularly described and ascertained the nature of my said invention and in what manner the same is to be performed, I declare that what I claim is—

1. Improved slime-filtering apparatus comprising a large number of hollow flat vertical filters parallel to each other and worked under vacuum suspended within a vat containing the material to be treated, each of said filters consisting of a skeleton framing covered with filter-cloth and arranged comparatively close together with scrapers between substantially as and for the purposes specified.

2. In a slime-filtering apparatus a number of filters arranged in separate groups in the vat, each group being suspended from an overhead arm and adapted to be raised or lowered, and provided with an independent draw-off pipe having a suitable cut-off cock substantially as described.

3. In slime-filtering apparatus, a series of hollow flat vertical filters consisting of skeleton framings divided into a number of practically independent vertical passages communicating with common top and bottom channels, the former fitted with pipes for drawing off the gold and silver bearing solution, and the latter with pipes for discharging the remaining solution therein, substantially as set forth and illustrated.

4. In slime-filtering apparatus, a number of filters each of which is composed of skeleton framing having a top and bottom curved sheet-iron cover into which vertical strips of hoop-iron at suitable distances apart are sprung and held in position by the edges of said covers engaging holes in the edges of said strips of iron, horizontal wires being passed through holes, suitably spaced, in the edges of the vertical strips, while the end strips are secured to the covers and filter-cloths are wrapped completely around the framing and secured on the top cover and ends by spring-clips substantially as described.

5. In slime-filtering apparatus and in combination a series of scrapers, arranged between the filters, and consisting of two horizontal metallic strips, and having a rubber or like packing secured between, the width of said packing being less than the space between the filters, rods connecting said scrapers with their frames and means for reciprocating the scrapers vertically substantially as described.

6. In slime-filtering apparatus, a plurality of filters, scrapers arranged between the filters, vertically-disposed rods connected with the scrapers, horizontally-disposed rods having holes to receive the respective vertically-disposed rods, means for actuating said horizontally-disposed rods, rock-shafts having levers, links between the respective rock-shafts and vertically-disposed rods, and means for operating the rock-shafts.

In testimony whereof I have hereunto set my hand in presence of two subscribing witnesses.

GEORGE SMITH DUNCAN.

Witnesses:
EDWARD WATERS,
EDWARD WATERS, Junr.